June 11, 1929.  W. L. R. EMMET  1,717,196
FLEXIBLE BELLOWS AND METHOD OF MANUFACTURING SAME
Filed May 22, 1925
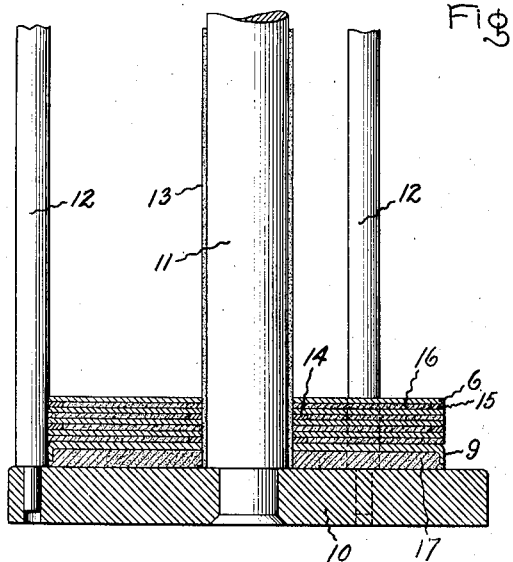
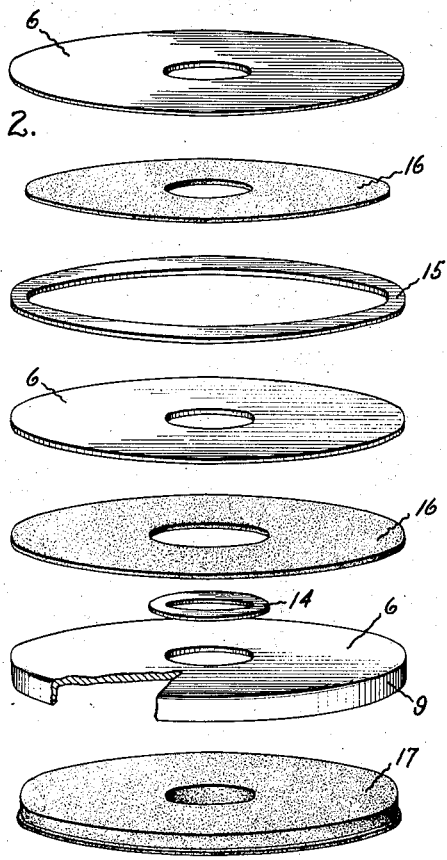
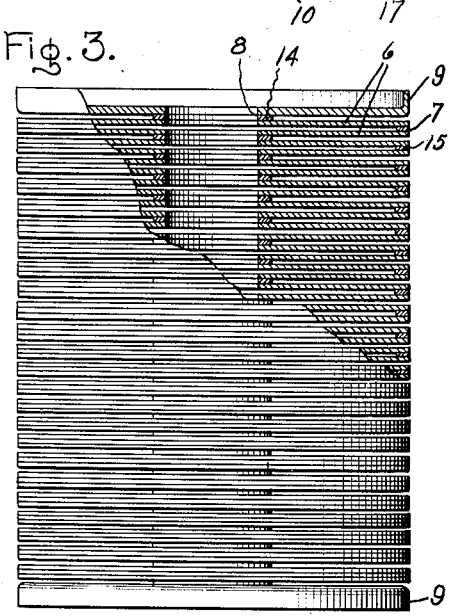
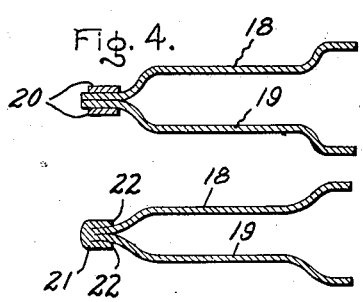
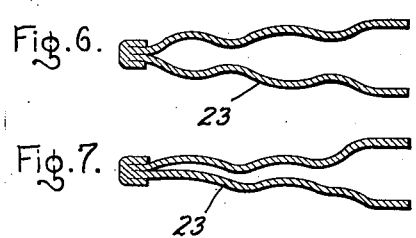
Inventor:
William L. R. Emmet,
by
His Attorney.

Patented June 11, 1929.

1,717,196

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

FLEXIBLE BELLOWS AND METHOD OF MANUFACTURING SAME.

Application filed May 22, 1925. Serial No. 32,211.

The present invention relates to flexible bellows of the type comprising a metal structure, usually cylindrical in contour, having corrugated side walls whereby the structure is adapted to expand and contract, or to be held at one end and given a gyratory movement of the other end. Such metal structures are adapted to a great variety of uses, and it is to be understood that a structure embodying my invention may be put to any use to which it may be found applicable.

The object of my invention is to provide an improved structure of the metallic bellows type, and an improved method of manufacturing the same, and for a consideration of what I believe to be novel and my invention, attention is directed to the accompanying description and the claims appended thereto.

In the drawing, Fig. 1 is a sectional view of a fixture which may be used in carrying out my invention, parts going to make up a complete bellows structure being shown assembled on the fixture; Fig. 2 is an exploded perspective view of parts which may be used in carrying out my invention; Fig. 3 is a view, partly in section, of a completed structure embodying my invention; Figs. 4 and 5 are detail sectional views of a modification, and Figs. 6 and 7 are detail sectional views of modifications.

Referring first to Fig. 3, a bellows structure embodying my invention comprises a plurality of separate annular metallic disks or washers 6 located in spaced relation to each other and suitably connected together at their outer and inner edges as indicated at 7 and 8, by fused metal, the connections 7 and 8 being staggered relatively to each other. That is to say, adjacent disks are connected together first at an inner edge and then at an outer edge. The two end disks 6 are provided preferably with flanges 9 for use in attaching the bellows to apparatus with which it is to be used and, if desired, these two end disks may be made from material thicker than that from which the other disks are made.

In uniting the edges of the disks, any suitable or desired method may be utilized. In the preferred form of my invention I unite them by means of an alloying metal applied to the joints in a reducing atmosphere after the manner of the method set forth in the patent to Christian Steenstrup, No. 1,528,581, dated March 3, 1925.

In constructing a bellows embodying my invention, according to the method illustrated in Figs. 1 and 2, I provide a fixture comprising a base 10 to which are attached a center or middle post 11 and a plurality of outer posts 12. For example, there may be three outer posts equally spaced around the center post. On the center post 11 is placed a sleeve of non-metallic heat-resisting material 13, such as asbestos for example. The arrangement is such that the diameter of the center post with the sleeve thereon is equal to the diameter of the opening in the disks from which the bellows is to be made, and that the diameter of the ring defined by the inner surfaces of posts 12 is equal to the diameter of such disks.

For use in building up in the fixture a bellows structure, I provide in addition to metallic disks 6, inner metallic spacers 14, outer metallic spacers 15, and separators 16 and 17, the separators being formed from suitable non-metallic heat-resisting material, such as asbestos, for example. I first place a separator 17 over center post 11, such separator resting on base 10, and I then place an end disk 6 thereon, that is, a disk having a flange 9. Following this, I next put an inner spacer 14 and a separator 16 on disk 6 and follow this by a second disk 6 and then an outer spacer 15 and another separator 16, and so on until a stack of the desired number of disks is provided. Separators 16 are of two sizes, one to fit around an inner spacer 14 and the other to fit within an outer spacer 15. In the completed stack it will be seen that the successive disks 6 stand in spaced relation to each other with an inner metallic spacer between one pair of adjacent disks and an outer metallic spacer between the next pair of adjacent disks and that they are held in correct alignment by the posts 11 and 12.

The built-up structure is now fastened or clamped together in a suitable manner, for example, by putting a weight on it, after which the outside posts 12 may be removed. It is then united to form an integral structure by fused metal, and preferably by the method set forth in the before-mentioned Steenstrup patent, although the structure may be united by other suitable methods. When employing the method of the Steenstrup patent, I preferably utilize copper as the alloying metal and carry out the operation in a suitably heated furnace in the presence of hydrogen. After the structure has been united by fused metal, it is taken from the fixture and the asbestos separators removed from between the disks. Due to the heating, the separators, when formed from asbestos, are reduced to a powder, and may be readily removed by shaking the structure or by suction. Any material other than asbestos which is found to be suitable may be used for separators, and it may be removed in any suitable manner. The finished product is a completed structure as shown in Fig. 3.

The foregoing method is only one of the methods which may be used in carrying out my invention. For example, I may unite the edges of the successive disks by welding, soldering or the like. In Figs. 4 and 5 I have shown a structure wherein the edges of the disks are welded together. The edges of successive disks 18 and 19 are placed in direct engagement with each other, and on opposite sides of them are placed metal rings 20 as shown in Fig. 4. The peripheral edges of disks 18 and 19 and rings 20 are then welded together as is indicated at 21 in Fig. 5. The rings 20 form in substance clamping rings between which the edges of the disks are held and over the inner edges 22 of which the disks flex when the bellows expands and contracts. These clamping rings serve to protect the welds so that the flexing does not take place in them, this being desirable in that, as a rule, the material of a weld is not as strong and homogeneous as is the material of the parts welded.

The particular arrangement shown in Figs. 4 and 5 possesses the advantage over an arrangement such as that shown in Figs. 1 to 3, of being formed all of one kind of metal which adapts it to some uses to which a bellows such as that shown in Figs. 1 to 3 would not be well adapted. For example, the arrangement of Figs. 4 and 5 is well adapted for use where it is subjected to the action of a vapor such as mercury vapor. A construction such as that shown in Figs. 1 to 3 would not be so well adapted for such use on account of the fact that mercury attacks copper to some extent. On the other hand, the arrangement of Figs. 4 and 5 possesses the disadvantage over that of Figs. 1 to 3 of being more costly to manufacture.

In Figs. 6 and 7, I have illustrated modifications of my invention wherein the disks or plates 23 from which the bellows are made are corrugated, the corrugations being opposed in the arrangement shown in Fig. 6 and nested in the arrangement shown in Fig. 7.

In providing a bellows formed from a plurality of separate spaced metallic disks united at their edges by fused metal, there results a structure wherein the metal at the joints between successive plates has not been distorted or placed under stress during the process of manufacture. As a result, the structure is stronger than would be the case otherwise, and hence will give substantially better service.

Also by building the structure from disks and spacers after the manner described, I am enabled to provide corrugations of any desired depths and at the same time place the disks close together. This results in a structure which is very flexible because of the depth of the corrugations and which at the same time is compact because of the closeness together of the disks. Or otherwise considered, in a bellows structure of a certain diameter and length, I am enabled to provide corrugations of much greater depths and much greater in number than heretofore. This not only adds greatly to the flexibility of the structure, but in addition gives the important result that, because of the greater number of corrugations in a given length, for a movement of a certain amount, each corrugation is required to move a proportionately less amount. As a result, the strain placed on it due to the movement is very much less.

The two features referred to above, that of providing a structure wherein the edges of the corrugations are not put under stress during the process of manufacture and one wherein a large number of deep corrugations are provided, when combined in a single structure, results in a structure having a remarkably long life and capable of efficient operation under the most severe conditions.

Also by the use of my method, I am enabled in any instance to construct a bellows from the material best suited for the use to which the bellows is to be put. For example, I am enabled to construct a bellows from a strong, stiff material such as steel or a steel alloy, and may use material of any desired thickness. In other words, I am not limited, in my improved method, to materials of a soft nature which stretch and bend easily. This is a matter of great importance, particularly when it is desired to construct a bellows of considerable strength and for withstanding pressures of considerable values, for in such instances, it is very desirable to use relatively thick strong material.

In accordance with the provision of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. The method of manufacturing a corrugated structure which comprises taking annular disks, assembling them in spaced relation to each other with their edges in engagement, placing clamping rings on opposite sides of said edges, and then welding together the peripheral edges of the rings and disks, the inner edges of the rings serving to protect the weld when the corrugated structure expands and contracts.

2. A bellows comprising a plurality of annular disks, the edges of which have flat portions which are in engagement with each other, and clamping rings between which said flat portions are held, the peripheral edges of said flat portions being directly united to each other and to the peripheral edges of said rings by fused metal, the inner edges of the rings serving to protect the weld when the bellows expands and contracts.

In witness whereof, I have hereunto set my hand this 21st day of May, 1925.

WILLIAM L. R. EMMET.